US012281697B2

United States Patent
Szegeny et al.

(10) Patent No.: US 12,281,697 B2
(45) Date of Patent: Apr. 22, 2025

(54) DRIVE UNIT FOR MOTOR VEHICLE APPLICATIONS

(71) Applicant: Kiekert AG, Heiligenhaus (DE)

(72) Inventors: Peter Szegeny, Engelskirchen (DE); Ömer Inan, Dorsten (DE); Michael Scholz, Essen (DE); Holger Schiffer, Meerbusch (DE)

(73) Assignee: Kiekert AG, Heiligenhaus (DE)

( * ) Notice: Subject to any disclaimer, the term of this patent is extended or adjusted under 35 U.S.C. 154(b) by 103 days.

(21) Appl. No.: 17/999,241

(22) PCT Filed: May 5, 2021

(86) PCT No.: PCT/DE2021/100407
§ 371 (c)(1),
(2) Date: Dec. 5, 2022

(87) PCT Pub. No.: WO2021/239180
PCT Pub. Date: Dec. 2, 2021

(65) Prior Publication Data
US 2023/0228322 A1    Jul. 20, 2023

(30) Foreign Application Priority Data
May 29, 2020  (DE) .................... 10 2020 114 465.2

(51) Int. Cl.
*F16H 37/12* (2006.01)
*E05B 17/00* (2006.01)
(Continued)

(52) U.S. Cl.
CPC .......... *F16H 37/122* (2013.01); *E05B 17/007* (2013.01); *E05B 81/06* (2013.01);
(Continued)

(58) Field of Classification Search
CPC ........ F16H 37/122; F16H 19/04; F16H 25/18; F16H 53/06; E05B 17/007; E05B 17/06;
(Continued)

(56) References Cited

U.S. PATENT DOCUMENTS 2,974,752 A    3/1961 Howard
4,301,696 A *  11/1981 Andersson ............. F16H 25/16
                                                    74/821
(Continued)

FOREIGN PATENT DOCUMENTS

CN    104727876 A *  6/2015  ............... F01L 1/14
CN    209874769 U    12/2019
(Continued)

OTHER PUBLICATIONS

JPH0719544U Espacenet machine translation claims and description (Year: 2024).*
(Continued)

*Primary Examiner* — Christine M Mills
*Assistant Examiner* — Steven A Tullia
(74) *Attorney, Agent, or Firm* — Renner, Otto, Boisselle & Sklar, LLP

(57) ABSTRACT

A drive unit for motor vehicle applications, in particular motor vehicle closing devices. The drive unit comprises an electric motor and at least one drive element driven by the electric motor. In addition, an actuation lever that cooperates with the drive element is provided. The drive element and/or the actuation lever are advantageously designed to be able to rotate about an axis. A rotatably mounted intermediate element is provided between the drive element and the actuation lever. According to the invention, the intermediate element is in the form of a friction-reducing rolling element.

17 Claims, 5 Drawing Sheets

(51) Int. Cl.
| | |
|---|---|
| *E05B 81/06* | (2014.01) |
| *E05B 81/16* | (2014.01) |
| *E05B 81/34* | (2014.01) |
| *E05B 81/42* | (2014.01) |

(52) U.S. Cl.
CPC .............. *E05B 81/16* (2013.01); *E05B 81/34* (2013.01); *E05B 81/42* (2013.01)

(58) Field of Classification Search
CPC .......... E05B 17/16; E05B 17/34; E05B 17/42; E05B 1/00; E05B 1/02; E05B 1/04; E05B 1/14; E05B 1/18; E05B 1/30; E05B 1/34; E05B 1/36; E05B 1/42; E05B 1/48; E05B 83/16; E05B 83/18; Y10T 292/1082; Y10T 292/1047; Y10T 292/1079; Y10T 292/306; Y10T 292/308; Y10S 292/23; Y10S 292/43

See application file for complete search history.

(56) References Cited

U.S. PATENT DOCUMENTS

| | | | | | |
|---|---|---|---|---|---|
| 4,518,181 | A | * | 5/1985 | Yamada | E05B 81/34 |
| | | | | | 292/201 |
| 4,583,728 | A | * | 4/1986 | Mathes | B41F 21/05 |
| | | | | | 74/54 |
| 4,667,991 | A | * | 5/1987 | Pebre | E05B 81/20 |
| | | | | | 292/216 |
| 4,785,942 | A | * | 11/1988 | Van Leijenhorst | B07C 3/065 |
| | | | | | 198/367 |
| 4,993,275 | A | * | 2/1991 | Pollich | F16H 25/16 |
| | | | | | 74/54 |
| 5,332,273 | A | * | 7/1994 | Komachi | E05B 81/25 |
| | | | | | 292/336.3 |
| 5,373,752 | A | * | 12/1994 | Schlagwein | F16H 25/20 |
| | | | | | 292/201 |
| 5,762,384 | A | * | 6/1998 | Bartel | E05B 81/40 |
| | | | | | 292/201 |
| 5,765,886 | A | * | 6/1998 | Buchanan, Jr. | E05B 81/22 |
| | | | | | 292/341.16 |
| 5,938,254 | A | * | 8/1999 | Weyerstall | E05B 81/22 |
| | | | | | 292/201 |
| 6,208,103 | B1 | * | 3/2001 | Kachouh | E05B 81/16 |
| | | | | | 70/192 |
| 6,874,828 | B2 | * | 4/2005 | Roatis | G07F 9/10 |
| | | | | | 292/201 |
| 9,080,653 | B2 | * | 7/2015 | Suzuki | F01L 13/0036 |
| 10,180,181 | B2 | * | 1/2019 | Cao | F02M 26/54 |
| 10,287,929 | B2 | * | 5/2019 | Pham | F01L 13/0063 |
| 11,072,948 | B2 | * | 7/2021 | Patane | E05B 81/42 |
| 11,534,874 | B2 | * | 12/2022 | Prusek | B23K 7/102 |
| 2005/0120987 | A1 | * | 6/2005 | Inaba | F01L 13/0015 |
| | | | | | 123/90.16 |
| 2006/0185464 | A1 | * | 8/2006 | Telep | F01D 17/16 |
| | | | | | 74/519 |
| 2018/0258671 | A1 | * | 9/2018 | Graute | E05B 81/50 |

FOREIGN PATENT DOCUMENTS

| | | | | |
|---|---|---|---|---|
| DE | 3629556 A1 | * | 3/1988 | .............. E05B 77/28 |
| DE | 19631869 A1 | * | 2/1998 | .............. E05B 77/26 |
| DE | 19841670 C2 | * | 1/2001 | .............. E05B 77/26 |
| DE | 10361168 A1 | | 7/2005 | |
| DE | 202010001358 U1 | * | 7/2011 | .............. E05B 15/10 |
| DE | 102010043260 A1 | | 11/2011 | |
| DE | 202010012379 U1 | | 12/2011 | |
| DE | 102016004531 A1 | * | 10/2017 | .............. F01L 1/047 |
| DE | 102016207237 A1 | * | 11/2017 | |
| DE | 102017220048 A1 | * | 5/2018 | |
| DE | 202017107026 U1 | * | 1/2019 | .............. B60R 7/06 |
| DE | 102017118470 A1 | * | 2/2019 | |
| DE | 102017124525 A1 | | 4/2019 | |
| DE | 102017125819 A1 | * | 5/2019 | .............. E05B 81/34 |
| DE | 102018105717 A1 | | 9/2019 | |
| DE | 102018110700 A1 | | 11/2019 | |
| DE | 102019119876 A1 | * | 1/2021 | .............. E05B 81/06 |
| DE | 112020005906 T5 | * | 9/2022 | .............. E05B 81/14 |
| DE | 102022125820 A1 | * | 4/2023 | .............. E05B 77/12 |
| EP | 0095983 A1 | * | 12/1983 | .............. E05B 81/54 |
| EP | 1061212 A2 | * | 12/2000 | .............. E05B 81/25 |
| EP | 1482190 A2 | * | 12/2004 | .......... C10M 141/10 |
| EP | 0897443 B1 | * | 3/2005 | .............. E05B 81/22 |
| EP | 2281983 A1 | * | 2/2011 | .............. E05B 15/0245 |
| EP | 2806188 A1 | * | 11/2014 | .............. C23C 30/00 |
| FR | 2528097 A2 | * | 12/1983 | .............. E05B 81/54 |
| GB | 2472271 A | * | 2/2011 | .......... E05B 15/0205 |
| JP | H0665585 U | | 9/1994 | |
| JP | H0719544 U | * | 4/1995 | .............. E05B 65/20 |
| JP | H0813880 A | | 1/1996 | |
| JP | H10317752 A1 | * | 12/1998 | .............. E05B 65/20 |
| JP | 2843046 B2 | * | 1/1999 | .............. E05B 81/14 |
| JP | 4343548 B2 | | 10/2009 | |
| KR | 19980032654 A | * | 7/1998 | .............. E05B 81/22 |
| KR | 200418883 Y1 | * | 6/2006 | .............. E05B 79/10 |
| WO | WO-9949159 A1 | * | 9/1999 | .............. E05B 81/14 |
| WO | WO-0053869 A1 | * | 9/2000 | .............. E05B 17/007 |
| WO | WO-2004101926 A1 | * | 11/2004 | .............. E05B 77/245 |
| WO | WO-2004101928 A1 | * | 11/2004 | .............. E05B 85/243 |
| WO | 2005025916 A1 | | 3/2005 | |
| WO | WO-2011062091 A1 | * | 5/2011 | .............. F16D 28/00 |
| WO | WO-2016071276 A1 | * | 5/2016 | .............. F02M 26/54 |
| WO | WO-2020257465 A1 | * | 12/2020 | .............. E05B 63/248 |
| WO | WO-2022161887 A1 | * | 8/2022 | .......... E05B 81/06 |

OTHER PUBLICATIONS

International Search Report mailed Aug. 12, 2021, for priority International Patent Application No. PCT/DE2021/100407.

* cited by examiner

Fig. 3
A)
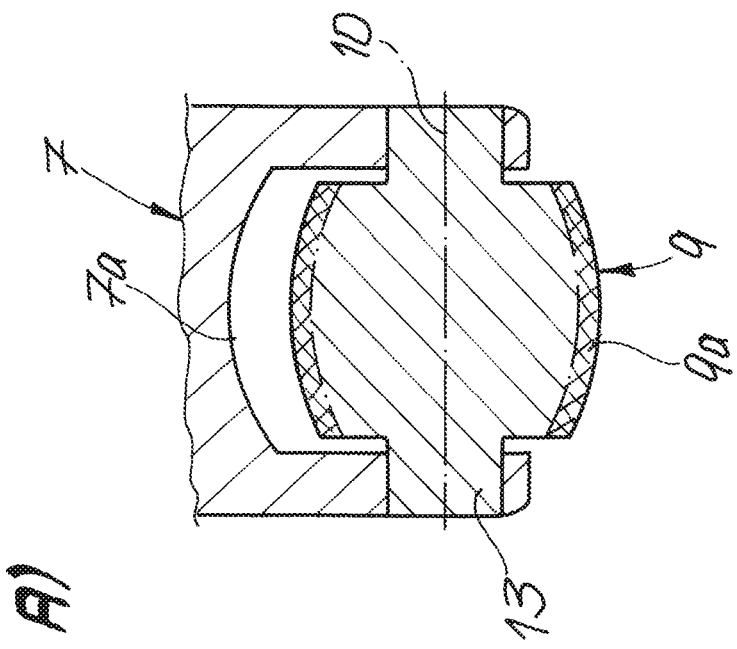
B)
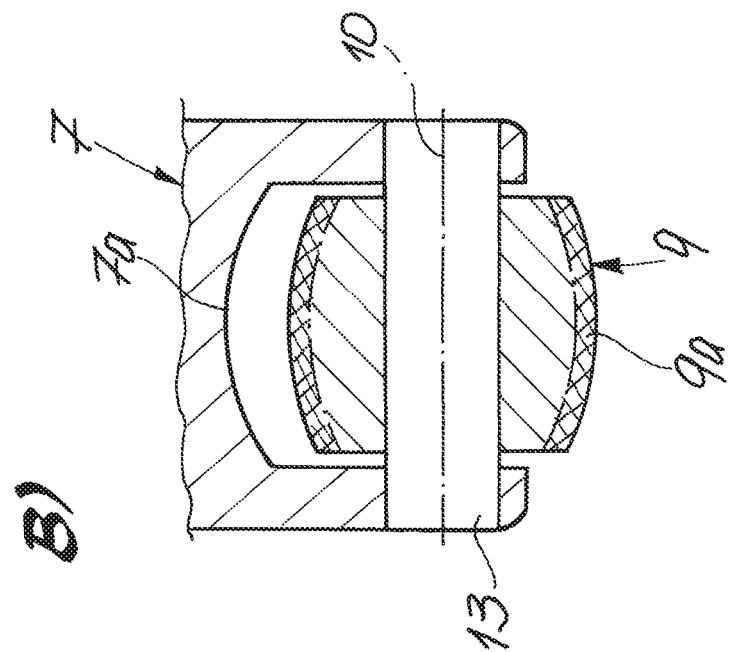

DRIVE UNIT FOR MOTOR VEHICLE APPLICATIONS

This application is a national phase of International Patent Application No. PCT/DE2021/100407 filed May 5, 2021, which claims priority to German Patent Application No. 10 2020 114 465.2 filed May 29, 2020, each of which is hereby incorporated herein by reference in its entirety.

FIELD OF DISCLOSURE

The invention relates to a drive unit for motor vehicle applications, in particular motor vehicle closing devices, having an electric motor and also at least one drive element driven by the electric motor, and having an actuation lever that cooperates with the drive element, wherein the drive element and/or the actuation lever are advantageously designed to be rotatable about an axis, and wherein a rotatably mounted intermediate element is provided between the drive element and the actuation lever.

BACKGROUND OF DISCLOSURE

Drive units for motor vehicle applications are widely used. They are all distinguished by the fact that the electric motor provided at this point is operated with low voltage (DC voltage) and, for the actuation of actuation elements with the aid of the actuation lever, gearing often has to be connected between the electric motor and the actuation lever. For example, window lifters, seat and mirror adjusters, steering wheel adjusters, headrest adjusters and in particular motor vehicle closing devices are controlled with such drive units. In the case of motor vehicle closing devices, the drive unit in question, which for this purpose is usually realized in the interior of a motor vehicle lock, ensures that an associated locking mechanism can be opened electrically. Other applications are of course also possible, for example such that a closing drive for the locking mechanism is realized by means of such a drive unit. The control of a (central) locking device is also conceivable.

Overall, the prior art according to DE 10 2018 110 700 A1 concerns a motor vehicle closing device or a motor vehicle lock which is equipped with a locking mechanism consisting of rotary latch and pawl. In addition, a release lever is realized which can assume or take over the function of the actuation lever. Furthermore, there is an electric drive unit with a motor and a PTO pulley driven by means of the motor. The release lever can be actuated by means of the PTO pulley in order to open the locking mechanism.

A comparable motor vehicle lock is the subject-matter of DE 10361168A 1. In this case too, a motorized drive is realized for the motorized lifting of the pawl from a lock latch. For this purpose, the motorized drive has a drive wheel and a control cam. The control cam itself works on an engagement end of a drive arm of a driver which interacts with the pawl.

The generic prior art according to DE 10 2018 105 717 A1 concerns a closing device for motor vehicle applications. This has a locking mechanism with a rotary latch and pawl, as well as a release lever wherein the locking mechanism can be unlocked by means of the release lever. In addition, a damping means is arranged between the release lever and the electric drive unit. The damping means can be designed as a separate component and have a pivotable bearing.

The prior art has proven itself in principle with regard to transferring the typically fast movements of the electric motor to the actuation lever with the interposition of the drive element. An actuation element is then acted upon by the actuation lever. The actuation element and the actuation lever can in principle also be rigidly connected to one another, or even have an integral design. In any case, the fast rotation of the electric motor is typically converted into a slow pivoting movement of the actuation lever in order to act on the control element as desired.

In the realization of, for example, a drive unit for a window lifter, the actuation element may be a raisable and lowerable window pane. If the drive unit is used in conjunction with a mirror or motor vehicle mirror, the actuation element is designed as mirror glass. In general, however, the focus is on applications in connection with motor vehicle closing devices in which the actuation lever usually operates indirectly or directly on an often-mandatory locking mechanism. This can take place in such a way that the actuation lever, as a release lever, lifts the pawl from its engagement with the rotary latch and, as a result, the motor vehicle closing device is opened by the drive unit using an electric motor.

In addition, however, it is also possible to provide a closing or drawing movement in the motor vehicle closing device by means of the drive unit. In this case, the electric motor operates, for example, indirectly or directly on the rotary latch as a component of the locking mechanism via the drive element and the actuation lever. If the rotary latch is in a pre-closed position or pre-latched position, then the rotary latch and with it the entire motor vehicle closing device can thereby be brought into a main closed position or main latched position.

In order to realize the actuation movement of the actuation element and consequently of the actuation lever, all of the described intended uses require a more or less high torque which is provided by the fast electric motor while implementing a mostly correspondingly adapted gear reduction at the end of the drive element in order to be able to correspondingly move the actuation lever. At this point, actuation cams are often used which interact with the actuation lever in the sense of sliding friction, as the state of the art according to DE 10 2018 110700 A1 or also according to DE103 61 168 A1 specifies. Although, at this point, cams made of plastic and an actuation lever made of steel are often used, improvements in the force transmission and the sliding friction implemented at this point are still possible and needed.

SUMMARY OF DISCLOSURE

Accordingly, the invention is based on the technical problem of further developing such a drive unit for motor vehicle applications so that friction-optimized operation is provided.

In order to solve this technical problem, the invention proposes, for a generic drive unit for motor vehicle applications, that the intermediate element between the drive element and the actuation lever is designed as a friction-reducing rolling element.

According to the invention, there is therefore an overall rolling movement and consequently rolling friction between the drive element and the actuation lever, which is acted upon by means of the drive element, due to the intermediate element which is arranged and rotatably mounted therebetween. Due to its principle, such a rolling friction is superior to the sliding frictions provided at this point in the prior art. This can be attributed to the fact that, for example, sliding friction coefficients are observed between the drive element (made of plastic) and the actuation lever (made of steel), which, in a dry state, are values of 0.12 (steel on steel). In contrast, the rolling friction realized according to the invention is provided with friction coefficients that are at least one order of magnitude less. For example, rolling resistance coefficients of approximately 0.001 are observed for steel ball bearings. Even automobile tires on concrete have rolling resistance coefficients of only 0.01 to 0.02.

It is therefore clear that the intermediate element between the drive element and the actuation lever, which is provided as a friction-reducing rolling element according to the invention, provides very low-loss force transmission while taking into account a friction-optimized design. In this case, the drive element or the actuation lever or even both can be designed to be rotatable about an axis. For example, it is conceivable for the drive element to be designed as a drive disk which is designed to be rotatable about an axis. Alternatively, the drive element can, however, also be designed to be linearly displaceable. This is then typically a linear actuation element. The linear actuation element can for its part be designed as a toothed rack and/or threaded spindle.

The actuation lever is for its part generally rotatably mounted about an axis. In this case, the actuation lever is a rotatable pivot lever. In general, however, the actuation lever can also be designed as a linearly displaceable push lever. In one way or another, a relative movement occurs between the drive element and the actuation lever.

This relative movement can take the form of a linear movement when the drive element is designed to be linearly displaceable and represents a linear actuation element. In this case, the actuation lever is designed as a push lever, and a linear relative movement occurs between the drive element and the actuation lever.

As a rule, however, a rotational relative movement is observed between the drive element and the actuation lever. This is because the drive element, or the actuation lever, or both are normally designed to be rotatable about an axis. In most cases, the design is even such that the actuation lever is designed as a pivot lever rotatable about an axis and, at the same time, the drive element represents a drive disk rotatable about an axis. In all of these cases, the intermediate element designed as a friction-reducing rolling element between the drive element and the actuation lever always ensures the desired friction optimization because, in contrast to the prior art, at this point, no sliding friction but rather a rolling friction with comparatively significantly reduced rolling resistance or much lower friction coefficients exists and is observed according to the invention. Herein lie the essential advantages.

According to a further advantageous embodiment, the rolling element is mounted rotatably about an axis in or on the actuation lever. In contrast, the drive element has an actuation ramp with which the rolling element interacts. In addition, the approach is usually such that the axis of the rolling element is oriented predominantly parallel to the surface of the actuation ramp in question on the drive element. As a result, the rolling element with its axis moves along the actuation ramp on the drive element as soon as the drive element is acted upon by the electric motor with respect to the actuation lever. The movement of the rolling element along the actuation ramp then for its part results in the actuation lever being acted upon. The actuation element is indirectly or directly connected to the actuation lever so that the desired actuation movement is realized as a result.

In the event that the drive element is configured as a drive disk which is designed to be rotatable about an axis, the actuation ramp is typically provided on an eccentric cam. In this case, the actuation ramp can run on the eccentric cam in a spiral plane or a helical plane.

In the first-cited case of the spiral plane, the actuation ramp has a two-dimensional profile, namely within the spiral plane. In contrast, the helical plane corresponds to a three-dimensional course of the actuation ramp on the eccentric cam. In both cases, the rolling movement of the rolling element along the actuation ramp when the drive disk is subjected to rotating action ensures that the actuation lever is acted upon as desired by the drive element in order for the connected actuation element to be acted on in the desired direction. As already stated above, the actuation element can be connected indirectly or directly to the actuation lever. Within the scope of the invention, an integral design of actuation lever and actuation element is also conceivable and is expressly included.

If the drive element is designed to be linearly displaceable as an alternative to the previously described procedure, the actuation ramp will be located on the linear actuation element realized in this case. The linear actuation element can in turn be designed as a toothed rack or threaded spindle. In the case of the toothed rack, the electric motor with a pinion provided on the output side engages into the teeth of the toothed rack in order to move it in the linear direction. In the case in which the linear actuation element is designed as a threaded spindle, it is possible, for example, to proceed in such a way that a retractable and extendable spindle engages in a drive wheel with internal thread driven by the electric motor, as is described in detail by way of example in the applicant's DE 202010012379 U1.

The rolling element as such is predominantly cylindrical to barrel-shaped. In addition, the rolling element has a central axis. The central axis of the rolling element is, as already described, oriented predominantly parallel to the surface of the actuation ramp on the drive element. This results in a uniform and centric sliding and rolling movement of the rolling element along the actuation ramp.

In this context, the axis or a pin defining the axis can be designed as a separate component for the rolling element. It is conceivable in this regard for the axis to be a pin engaging in a hole in the rolling element. Alternatively, however, the axis and the rolling element can also be designed integrally.

Various variants are conceivable for the materials used in the rolling element. For example, the rolling element can be produced from metal, in particular steel. Typically, and in order additionally to keep possible noise emissions low, a rolling element made of plastic is, however, used. In this case, the axis formed integrally with the rolling element can be realized very easily because it is or can be a single-piece injection-molded plastic part.

Furthermore, the rolling element can have a multilayered structure. It has proven particularly advantageous in this regard if the rolling element is equipped with a surface coating which is designed as a rubber running surface. The rubber running surface can be a rubber strip, a rubber ring, etc. inserted onto or into the surface of the rolling body. This is particularly recommended for the case in which the rolling body as such is designed metallic.

When a rolling body made of plastic is realized, it is likewise possible and advantageous to work with a multi-layered structure and a surface coating. In this case, the rubber coating can be formed on the plastic of the rest of the rolling body, and can be applied, for example, by a two-component plastic injection-molding process. In this case, the rolling body may be produced from a thermoplastic plastic, whereas an elastomeric plastic is used for the surface coating, and both plastics are combined with one another by the described two-component plastic injection-molding process to form the rolling body. Of course, at this juncture, other material pairings are also conceivable, for example a thermoplastic plastic for the rolling body and a plastic with embedded reinforcements, such as glass fibers for the surface coating, in order to provide a particularly resistant surface in this case.

As a result, a drive unit for motor vehicle applications is made available which is suitable in particular for use in connection with motor vehicle locking devices. This can be attributed to the friction-optimized operation and consequently the particularly low-loss force transmission from the electric motor to the actuation lever. As a result, for example, a particularly low-force electrical opening of the motor vehicle closing device is possible, as is a closing. Other of the aforementioned applications can also be achieved with reduced force compared to the prior art. As a consequence, it is ultimately possible to work with a smaller-dimensioned electric motor compared to the prior art, which provides additional cost and weight advantages. Herein lie the essential advantages.

BRIEF DESCRIPTION OF DRAWINGS

The invention is explained in greater detail below with reference to drawings which show only one exemplary embodiment. In the drawings:

FIGS. 3A and 3B show different variants of the bearing of the rolling body.

DETAILED DESCRIPTION

Figure 1:
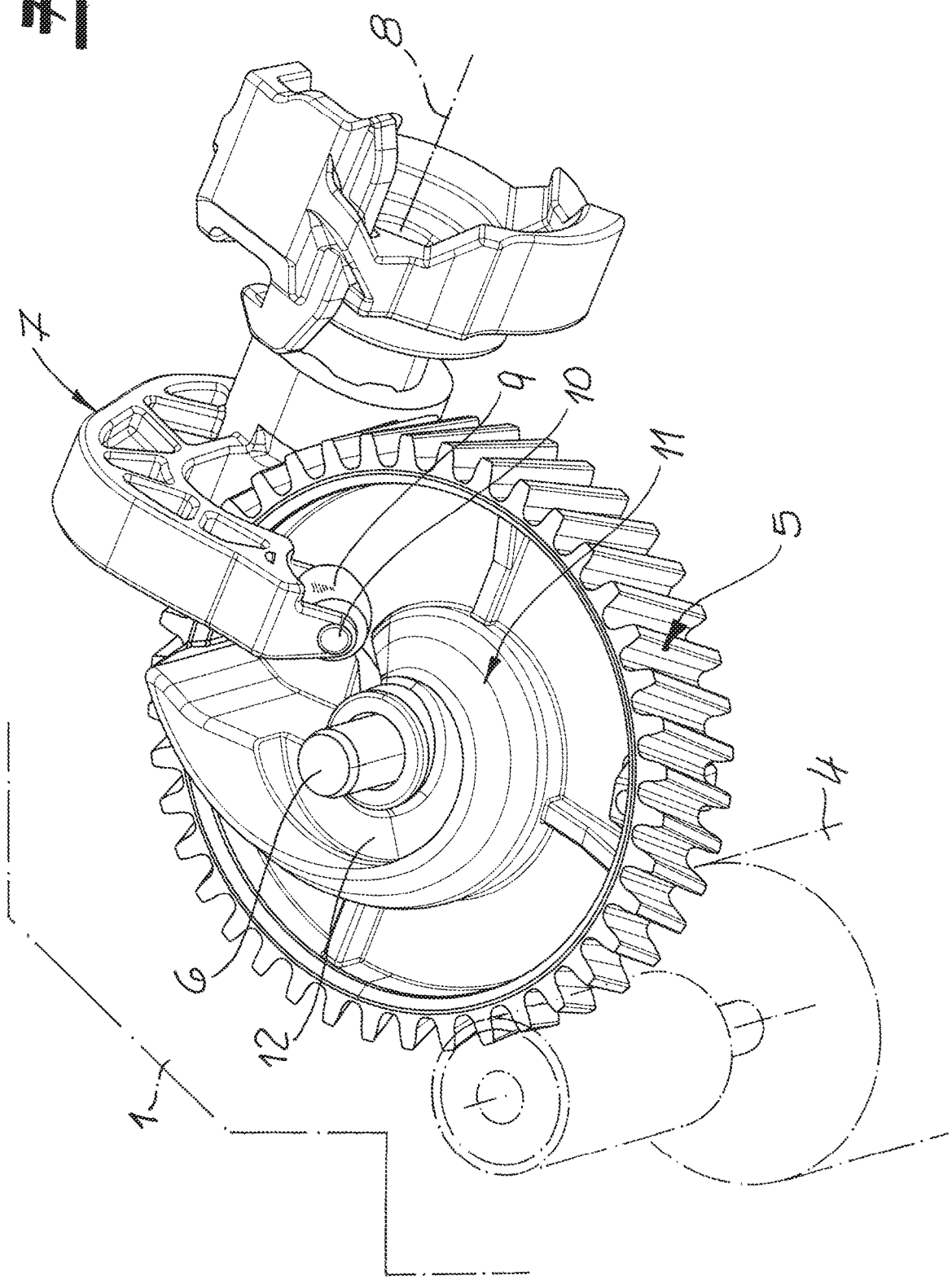
FIG. 1 shows a perspective view of the drive unit according to the invention in a first variant.

The figures show a drive unit for motor vehicle applications. In fact, the drive unit is used in a motor vehicle closing device and in particular a motor vehicle lock. For this purpose, the motor vehicle lock has a housing 1 that houses the drive unit which will be described in the following and is only suggested in FIG. 1. In the housing 1, in addition to the drive unit in question, there is a locking mechanism 2, 3 consisting of rotary latch 2 and pawls 3. This is only suggested in FIG. 2. By way of example, the drive unit ensures that the pawl 3 in the side view according to FIG. 2 is pivoted in the clockwise direction and thereby releases the rotary latch 2 which then opens in a spring-assisted manner. In other words, the locking mechanism 2, 3 is electrically opened by means of the drive unit in the present case. The drive unit described in more detail below is, however, expressly not limited to such an application, as the fields of application listed in the introduction to the description and many others make clear.

In fact, the drive unit has an electric motor 4, by means of which a drive element 5 is acted on by the electric motor 4. Under the rubric of the variants according to FIGS. 1, 2 and 5, the drive element 5 is a drive disk, while the exemplary embodiment according to FIG. 4 in this context shows a linear actuation element as the drive element 5. Correspondingly, the drive element 5 or the drive disk is rotatably mounted about an axis 6.

An actuation lever 7 interacts with the drive element 5. According to the exemplary embodiment in the figures, the actuation lever 7 is a pivot lever which is pivotably mounted about an axis 8. With reference to FIG. 2, it can be seen that the pawl 3 is connected to the actuation lever 7 coaxially with the axis 8 of the actuation lever 7 so that the pivot movements of the pawl 3 indicated in FIG. 2 and caused by the actuation lever 7 handle the previously mentioned opening of the locking mechanism 2, 3.

A rotatably mounted intermediate element 9 is provided between the drive element 5 and the actuation lever 7 which, according to the invention, is a friction-reducing rolling element 9. For this purpose, the rolling element 9 is rotatable about an axis 10 mounted in or on the actuation lever 7. The axis 10 of the rolling element 9 extends predominantly parallel to the surface of an actuation ramp 11 on the drive element 5.

Figure 2:
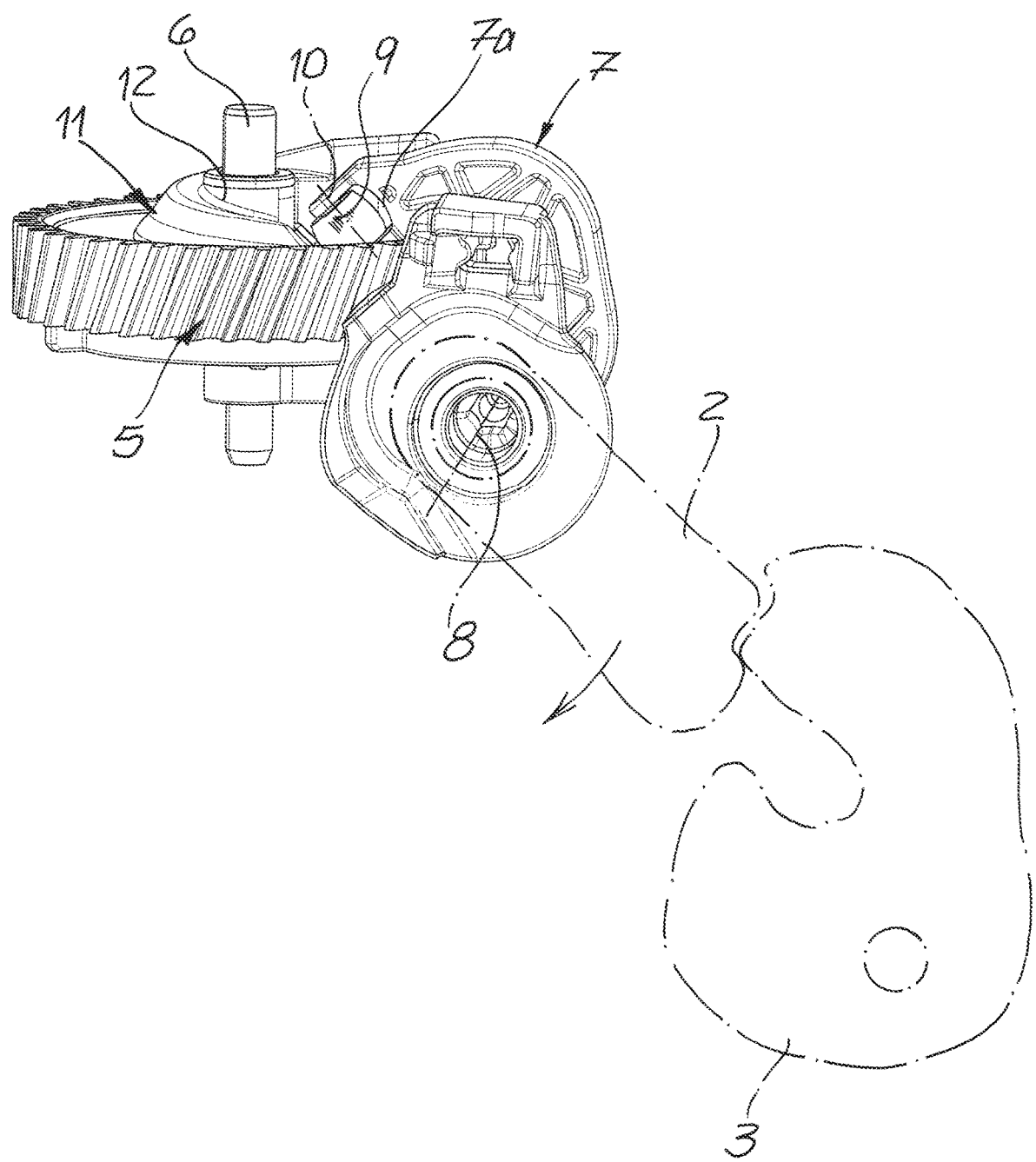
FIG. 2 shows the drive unit according to FIG. 1 in a side view.
Figure 4:
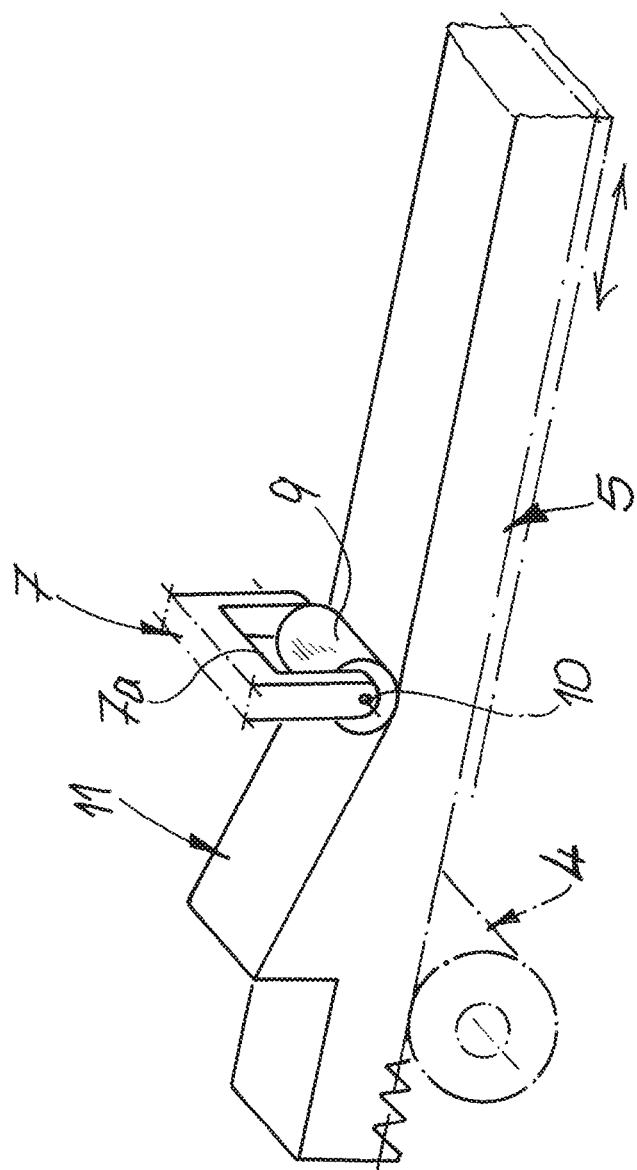
FIG. 4 and FIG. 5 show further 2nd and 3rd exemplary embodiments of the drive unit according to the invention.
Figure 5:
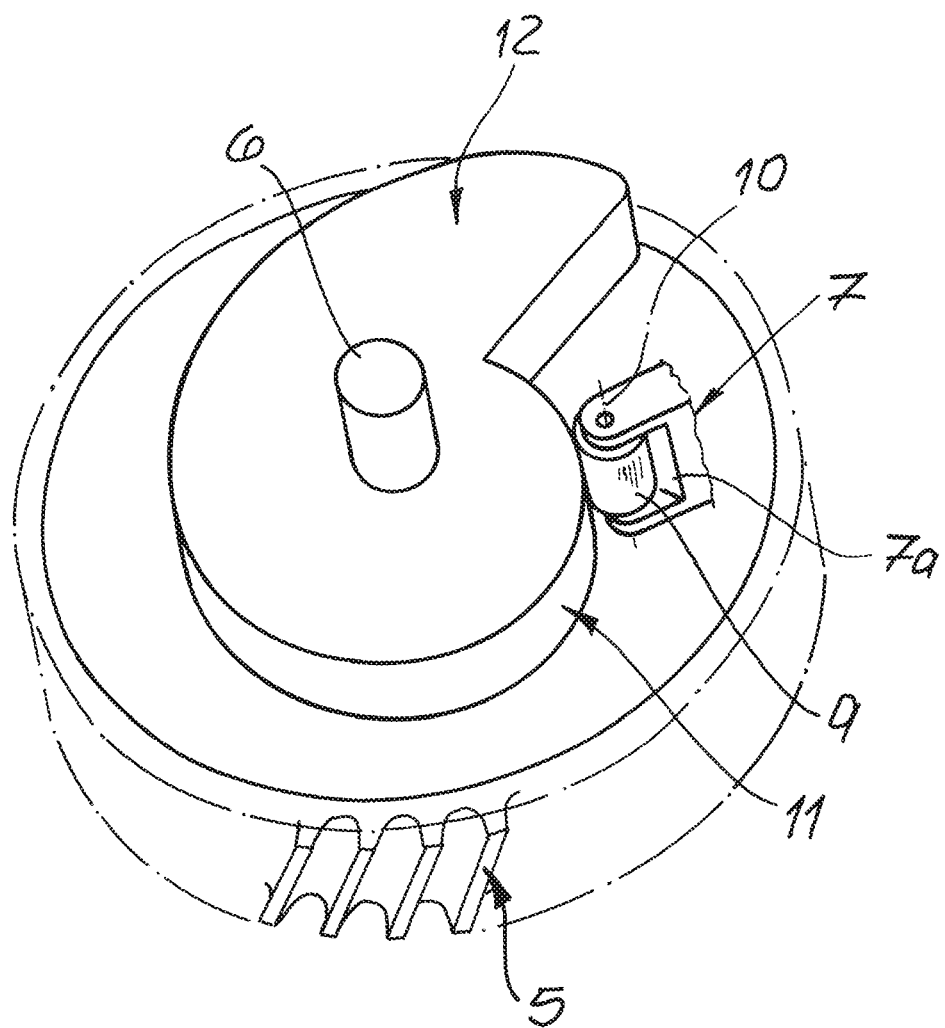

In the exemplary embodiment according to FIGS. 1, 2 and 5, the actuation ramp 11 is in each case provided on an eccentric cam 12 which, starting from the axis 6 of the drive disk realized in this context, is formed on a surface side of the drive disk. In contrast, the variant according to FIG. 4, with the drive element 5 designed as a linear actuation element, has recourse to an actuation ramp 11 oriented and standing out in the longitudinal direction of the linear actuation element. In the exemplary embodiment according to FIGS. 1 and 2, the actuation ramp 11 on the eccentric cam 12 runs in a helical plane and thus has a spatial extent. Contrastingly in the exemplary embodiment according to FIG. 5, the actuation ramp 11 is formed as a spiral plane with an entirely planar extent on the associated eccentric cam 12.

The actuation ramp 11 of the drive element 5 designed as a linear actuation element of the variant according to FIG. 4 is designed as a triangular ramp in cross-section. In this case, the linear actuation element is designed overall as a toothed rack into which a worm wheel (indicated in a section in FIG. 4) on the output shaft of the electric motor 4 engages in order to be able to produce and execute the linear actuating movements indicated there in the longitudinal direction of the linear actuation element or drive element 5.

In FIGS. 3A and 3B, the rolling element 9 is shown in detail in various forms. In fact, it can be seen that the rolling element 9 is equipped with a separate pin 13 defining its axis 10, as reflected in FIG. 3B. In this case, pin 13 may be made of metal or steel, whereas the rolling element 9 may be produced of plastic. In the variant according to FIG. 3A, the pin 13 and the rolling element 9 therein are designed as a one-piece component made of plastic.

In both cases, the rolling element 9 may be equipped with a (merely suggested) surface coating 9a. As a result, the rolling element 9 typically has a multilayered structure. The surface coating 9a may be designed, for example, as a rubber coating or even plastic coatings. In the event that the rolling body 9 is made of plastic, joint production of the two layers in the sense of a two-component manufacturing process is recommended. In this case, the approach can be to produce the rolling body 9, for example, from a thermoplastic and the surface coating 9a from an elastomeric plastic simultaneously in a joint two-component plastic injection-molding process. Of course, this is only by way of example and by no means mandatory. Either way, the rolling element 9 is formed predominantly cylindrical to barrel-shaped with the central axis 10.

All of the embodiments of the actuation lever 7 according to FIGS. 3A and 3B are characterized in that the actuation lever 7 has a forked holder 7a at its head end and facing the drive element 5 for receiving and bearing the rolling body 9. For this purpose, the forked holder 7a has two fork arms which serve to bear pin 13 defining the axis 10 of the rolling body 9.

In addition, it can be seen that the rolling body 9 is predominantly designed cylindrical to barrel-shaped in cross-section with the central axis 10. In this way, the arcuate surface coating 9a can easily follow the different forms of the actuation ramp 11, and in particular the actuation ramp 11 describing the helical plane in the case of the embodiment variant according to FIGS. 1 and 2.

In this way, pressure applied to the drive element 5 always causes pressure to be applied to the rolling body 9 by the actuating ramp 11, and in the process, the actuating lever 7 executes a pivoting movement about its axis 8. This pivoting movement about the axis 8 is converted according to the exemplary embodiment in FIGS. 1 and 2 into a clockwise movement, shown in FIG. 2, of the pawl 3 which is thereby released from the rotary latch 2, which for its part opens in a spring-assisted manner. Instead of the pawl 2, the drive unit can of course work on any other conceivable actuation element which can be coupled directly or indirectly with the actuation lever 7, as described in the introduction.

LIST OF REFERENCE SIGNS

Housing 1
Rotary latch 2
Locking mechanism 2, 3
Pawl 3
Electric motor 4
Drive element 5
Axis 6
Actuation lever 7
Forked holder 7a
Axis 8
Intermediate element 9
Rolling element 9
Axis 10
Actuation ramp 11
Eccentric cam 12
Pin 13

The invention claimed is:

1. A drive unit for motor vehicle applications, the drive unit comprising:
   an electric motor and a drive element driven by the electric motor,
   an actuation lever cooperating with the drive element, wherein the actuation lever is rotatable about a first axis, and
   a rotatably mounted intermediate element positioned between the drive element and the actuation lever, wherein the intermediate element is a friction-reducing rolling element,
   wherein the rolling element is mounted rotatably about a rolling element axis in or on the actuation lever, and
   wherein the rolling element axis and the first axis of the actuation lever are different and non-parallel.

2. The drive unit according to claim 1, wherein the rolling element axis is oriented parallel to a surface of an actuation ramp on the drive element.

3. The drive unit according to claim 2, wherein the drive element is configured as a drive disk which is rotatable about a second axis, wherein the actuation ramp is provided on an eccentric cam.

4. The drive unit according to claim 3, wherein the actuation ramp runs on the eccentric cam in a spiral plane or a helical plane.

5. The drive unit according to claim 2, wherein the drive element is a linear actuation element that is linearly displaceable, and wherein the actuation ramp is provided on the linear actuation element.

6. The drive unit according to claim 5, wherein the linear actuation element is one of a toothed rack or a threaded spindle.

7. The drive unit according to claim 5, wherein the actuation lever is a push lever that linearly displaces the linear actuation element.

8. The drive unit according to claim 1, wherein the rolling element is cylindrical or barrel-shaped relative to the rolling element axis.

9. The drive unit according to claim 1, further comprising a pin defining the rolling element axis, wherein the pin is a separate component from the rolling element.

10. The drive unit according to claim 1, wherein the rolling element has a multilayered structure with at least one surface coating.

11. The drive unit according to claim 10, wherein the surface coating is at least one of a rubber coating and a plastic coating.

12. The drive unit according to claim 1, further comprising a pin defining the rolling element axis, wherein the pin is an integral component with the rolling element.

13. The drive unit according to claim 1, wherein the actuation lever and the drive element rotate about different axes.

14. The drive unit according to claim 13, wherein the drive element rotates about a second axis, and wherein the second axis of the drive element is perpendicular to the first axis of the actuation lever.

15. The drive unit according to claim 1, wherein the actuation lever includes a forked holder that receives the rolling element and bears a pin that defines the rolling element axis.

16. The drive unit according to claim 1, wherein the rolling element axis and the first axis of the actuation lever are perpendicular.

17. A motor vehicle lock comprising:
   a locking mechanism comprising a rotary latch and a pawl; and
   the drive unit according to claim 1 that electrically operates the locking mechanism.

* * * * *